Dec. 15, 1936.   B. S. TALBOTT   2,064,393
COLLAPSIBLE WINDSHIED VISOR
Filed June 30, 1933
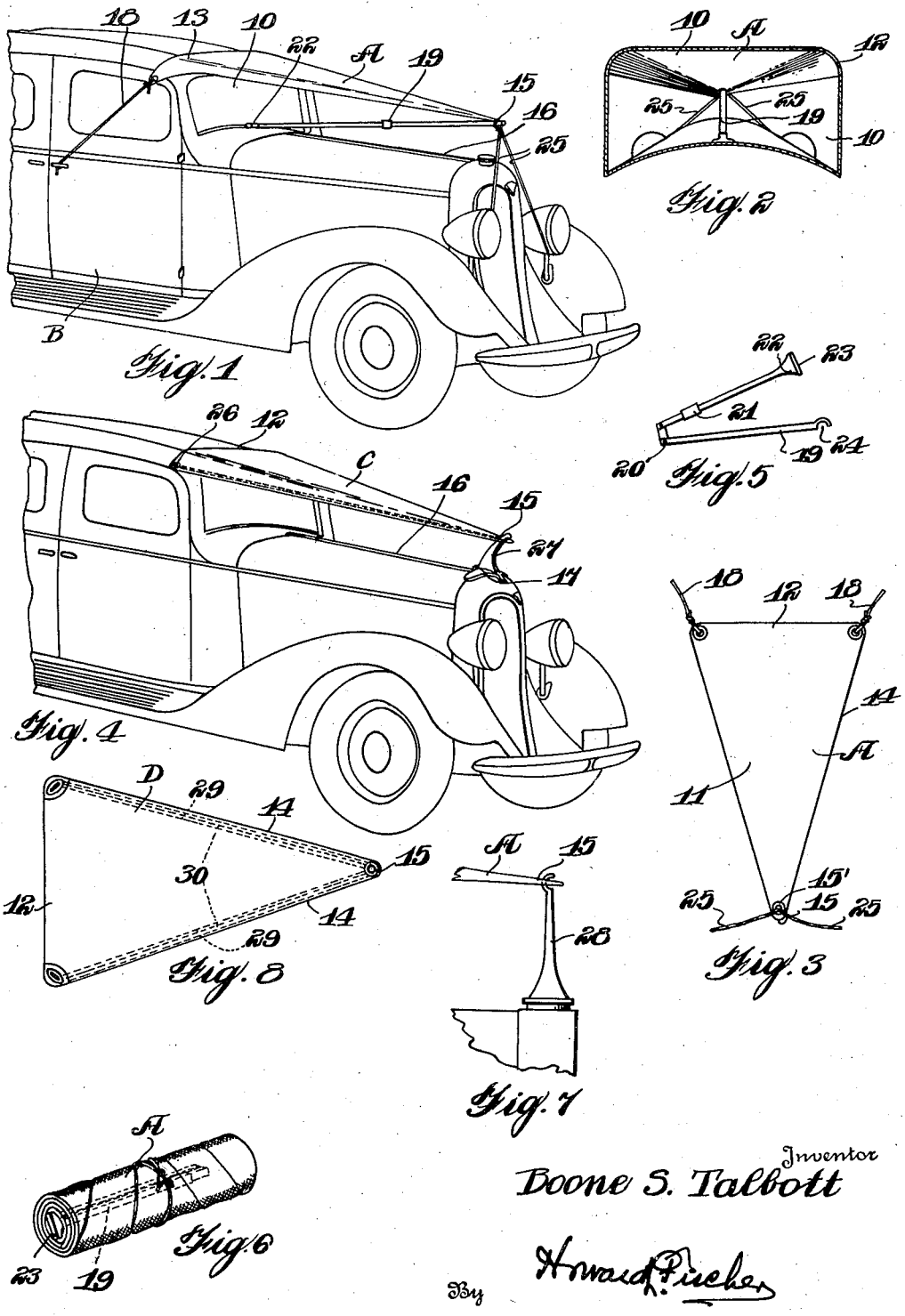
Inventor
Boone S. Talbott
By Howard Pincher
Attorney Patented Dec. 15, 1936

2,064,393

UNITED STATES PATENT OFFICE 2,064,393

COLLAPSIBLE WINDSHIELD VISOR

Boone S. Talbott, St. Paul, Minn.

Application June 30, 1933, Serial No. 678,446

3 Claims. (Cl. 296—95)

This invention relates to a collapsible windshield visor which is adapted to be folded up and stored away in an automobile when it is not desired for use, in a compact state, thus making it convenient to carry and always ready for use.

A feature resides in providing a visor for windshields of automobiles which may be readily secured in place to extend out forwardly of the windshield in triangular formation to prevent sleet from collecting and freezing on the windshield, and also providing a means of protecting the driver by insuring a clear vision either from the glare of the sun or from rain or snow.

The visor consists of a triangular piece of canvas or other suitable flexible material, the base of which extends taut over and is fastened at each side to the driver's cab by cords or other suitable fastening means. The outer end of the triangular visor is carried forward at a suitable height to be in line with the top of the driver's cab and is supported at the outer end by a mast which may extend from the lower end of the windshield where the mast rests upon a rubber or cushion base and the forward end being secured at the point of the visor. Where the mast extends to support the visor in this manner I provide brace cords which extend from the point of the visor and end of the mast down toward the lamp brackets and may be secured thereto or to any other portion of the automobile adjacent the lamps so as to provide a suitable brace for the outer end of the mast and visor.

My triangular-like visor may also be supported by a suitable bracket arm which can be a part of the radiator cap or can be in the form of a brace which extends up from the radiator adjacent the edge of the hood and which is adapted to have sufficient strength to support the front end of the visor without the mast or brace cords.

The visor is of a collapsible nature, being formed of any suitable strong textile or other material which may be weather-proofed, if desired, and which can be readily rolled up about the mast which is made in sections so that it can fold together, permitting the visor to be conveniently carried. A feature resides in a visor which may extend out sufficiently forward from the windshield to protect the same in a practical manner.

The triangular visor may also be reinforced by marginal brace members which may be detachably supported in the margin of the visor and which will extend from the sides of the cab to the apex of the visor.

With my visor the driver of an automobile may enjoy a clear vision, virtually irrespective of weather conditions. In touring my visor has a very decided advantage, more particularly with present types of cars than ever before, because of the backwardly slanting windshields and the virtual utter lack of outer visors as standard construction.

The drawing illustrates my invention in its various suggested forms.

Figure 1 illustrates a perspective of my visor attached to an automobile.

Figure 2 is a diagrammatic view, looking out of the windshield toward the radiator cap to illustrate the clear vision of the driver.

Figure 3 is a diagrammatic plan view of my visor, illustrating the general triangular shape.

Figure 4 is a perspective of another form of my visor attached to an automobile without the mast from the windshield to the apex of the visor, but supporting the forward end of the visor by a bracket coming up from the hood of the automobile.

Figure 5 illustrates the collapsible mast used in the structure of Figure 1.

Figure 6 illustrates my visor in its collapsed form, rolled up so that it can be stored away in the automobile.

Figure 7 illustrates a radiator cap mast for the front end of the visor.

Figure 8 illustrates the visor with marginal brace means extending from the base to the apex of the visor, showing the visor in plan view.

My visor A is of a textile nature, such as canvas or other suitable strong material, which may be water-proofed if desirable, by a water-proofing treatment, or may be of the ordinary canvas which will serve to shield the windshield 10 of the automobile B. The body 11 of the visor A is triangular in shape, having a base portion 12 which is adapted to fit over the front end of the cab 13 of the automobile B while the side edges 14 project to the apex 15 to extend the visor out over the hood 16 of the automobile virtually to a point above the radiator cap 17.

The visor A may be held by suitable cords 18 at the base portion 12 which may be attached at a convenient point, such as to the shank of the door handles of the doors of the cab of the automobile. Thus the cords 18 will hold the base portion 12 drawn taut over the front end of the cab 13.

I provide a mast 19 which may be formed of a foldable nature, with the hinge portion 20 and a locking sleeve 21 so that the mast 19 may be folded together when it is desired to roll up the visor A into a compact package, as illustrated in Figure 6. This permits the visor to be stored away when it is not desired for use. The mast 19 is formed with a base portion 22 which has a rubber cushion 23 on the same which is adapted to rest against the lower edge centrally of the windshield 10 as illustrated in Figure 1. The outer end of the mast 19 has a hook member 24 which extends through the eyelet 15' in the apex 15 of the visor A so as to support the apex stretched out over the hood 16.

The apex 15 of the visor A may be braced by the cords 25 which extend from either side of the apex 15 of the visor and are adapted to brace the forward end of the mast rigidly when the visor is in use.

My visor may be made in the form C illustrated in Figure 4, with the corners of the base secured at 26 by suitable buttons or clips supported by the cab 13 which are adapted to hold the base 12 of the visor taut and firmly in place instead of the cords 18. The visor C does not require a mast 19, but is held at the apex 15 by the bracket 27 which is attached to the back of the radiator directly in back of the radiator cap 17. The bracket 27 extends on either side of the filler cap 17 and is formed to engage the radiator shell under the front edge of the hood 16.

The apex 15 of the visor A may also be held without the mast 19 by the radiator cap bracket 28 illustrated in Figure 7, if it is desired. It is also apparent that some cars are made with radiator cap emblems which may be made of a suitable nature to include a mast-like bracket, such as 28, it being understood that the bracket 28 is made sufficiently strong to support the apex 15 of the visor A.

The visor A may be unhooked at the apex 15 from the forward mast which supports the same, when it is desired to raise the engine hood to inspect the engine. The stretch of the visor is sufficient to permit this to be done if it is desired. Naturally, it is not often the engine hood is raised, so that this operation is not so material, but it should be borne in mind that it can be done, showing the convenience of the use of my visor.

I have illustrated another form D of my visor, wherein the edges 14 are formed with marginal hems 29 into which brace members 30 may be slid so as to stiffen and reinforce the edges 14, as illustrated in Figure 8. The braces 30 extend from the corner of the base 12 of the visor D to the apex 15, thus forming a reinforcing means along the edges 14 of a desirable nature which obviate the necessity of the center mast 19 when the apex 15 is held by a bracket such as 27 or 28.

It will be readily apparent that my visor is of a very desirable nature in touring or driving an automobile. I have found that my visor prevents any chance of sleet forming on the windshield 10 as well as protecting the windshield 10 so that even in a snow storm the driver has the advantage of a clear vision through the windshield. Further, my visor has also been found to be very desirable for driving against the sun at certain times of the day, as well as giving a clear vision to the tourist without the detrimental effect of the light which ordinarily the driver must face under various driving conditions. My visor is simple, economical, and may quickly be placed in position for use, or stored away in a convenient place in the automobile.

In accordance with the patent statutes I have set forth the structure of my visor in some of the preferred forms, however, it is apparent that the same should be considered within the scope of the following claims.

I claim:

1. A visor for windshields in combination with a windshield and windshield glass including a member adapted to be secured over the top of the windshield and adapted to project forwardly therefrom, and a mast bearing on the external surface of the windshield glass extending from the base of the windshield for supporting the outer end of the visor.

2. A visor for windshields in combination with a windshield having windshield glass therein including a member adapted to be secured over the top of the windshield and adapted to project forwardly therefrom, and a mast bearing on the external surface of the vehicle centrally of the windshield and extending from the base of the windshield for supporting the outer end of the visor.

3. A visor for windshields in combination with a windshield including a member adapted to be secured over the top of the windshield and to project forwardly therefrom, means securing said visor to the top, means supporting the outer end of said visor, and removable reinforcing means along some of the edges of said visor between said securing means and said supporting means, said securing and supporting means holding said reinforcing means from disengagement when said visor is in operative position.

BOONE S. TALBOTT.